April 12, 1955 — F. W. SAMPSON — 2,705,816

METHOD OF MAKING A STEERING WHEEL

Filed Aug. 31, 1950 — 3 Sheets-Sheet 1

INVENTOR
F. W. SAMPSON
BY Willits Hardman & Fehr
his ATTORNEYS

April 12, 1955 F. W. SAMPSON 2,705,816
METHOD OF MAKING A STEERING WHEEL
Filed Aug. 31, 1950 3 Sheets-Sheet 2
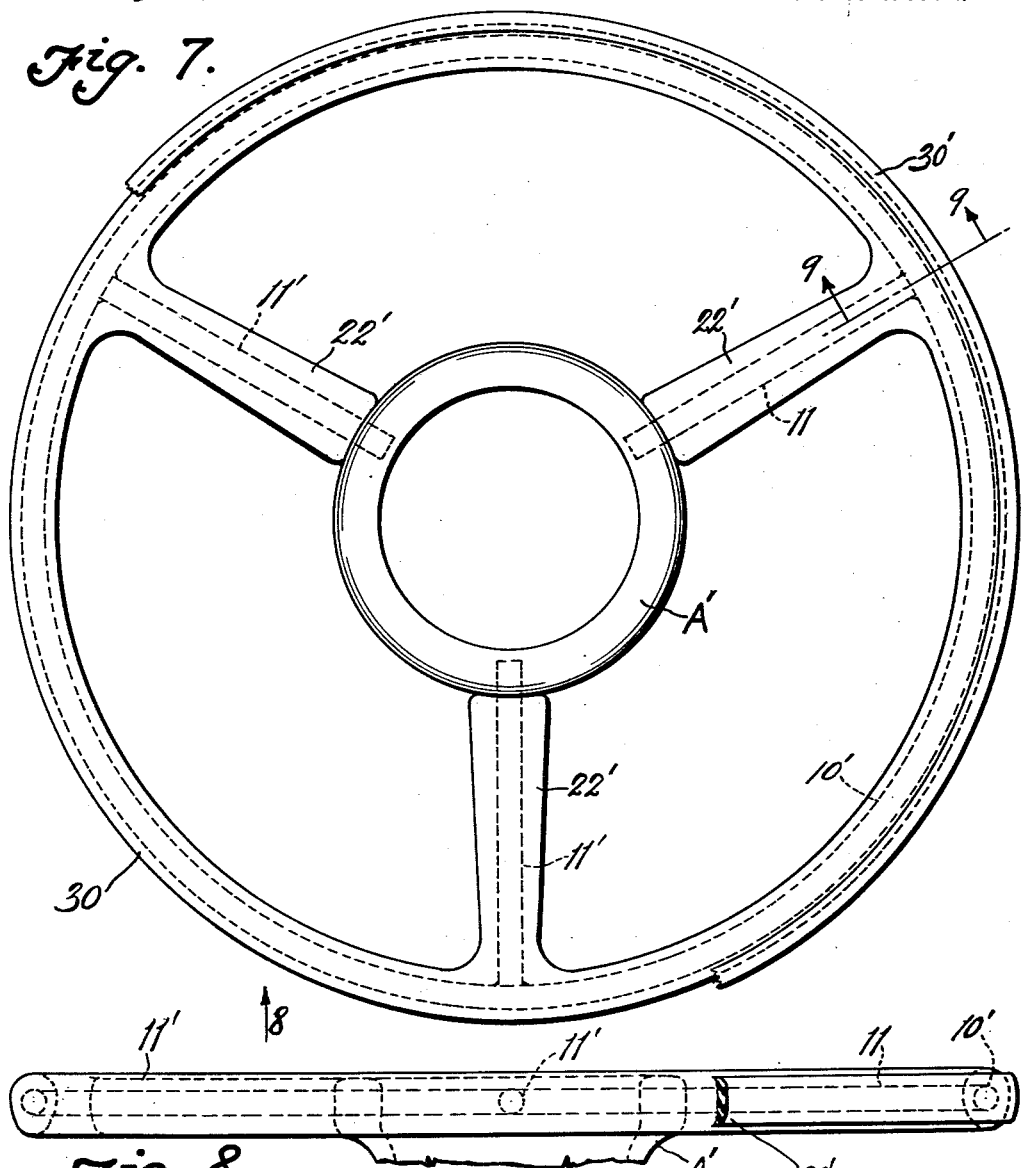
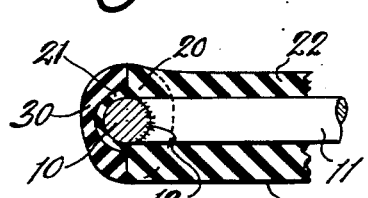
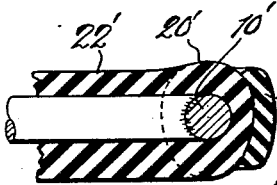
INVENTOR
F. W. SAMPSON
BY
Willits Hardman & Fehr
his ATTORNEYS April 12, 1955   F. W. SAMPSON   2,705,816
METHOD OF MAKING A STEERING WHEEL
Filed Aug. 31, 1950   3 Sheets-Sheet 3

INVENTOR.
F. W. Sampson
BY
Willits Hardman and Pec
HIS ATTORNEYS

2,705,816

METHOD OF MAKING A STEERING WHEEL

Frederick W. Sampson, Dayton, Ohio, assignor to General Motors Corporation, Detroit, Mich., a corporation of Delaware Application August 31, 1950, Serial No. 182,511

3 Claims. (Cl. 18—59)

This invention relates to an improved method of molding a metal reinforced steering wheel rim, or the like, in a double molding operation using two contrasting molding materials of different color or type.

An object of the invention is to provide a method of molding such a metal reinforced rim, or similar annulus, wherein the two separately molded portions thereof each forms part of the final molded surface and are integrally molded together with a joint therebetween which is tightened rather than loosened by shrinkage of the molded material.

Further objects and advantages of the present invention will be apparent from the following description, reference being had to the accompanying drawings wherein a preferred embodiment of the present invention is clearly shown.

Figure 1:
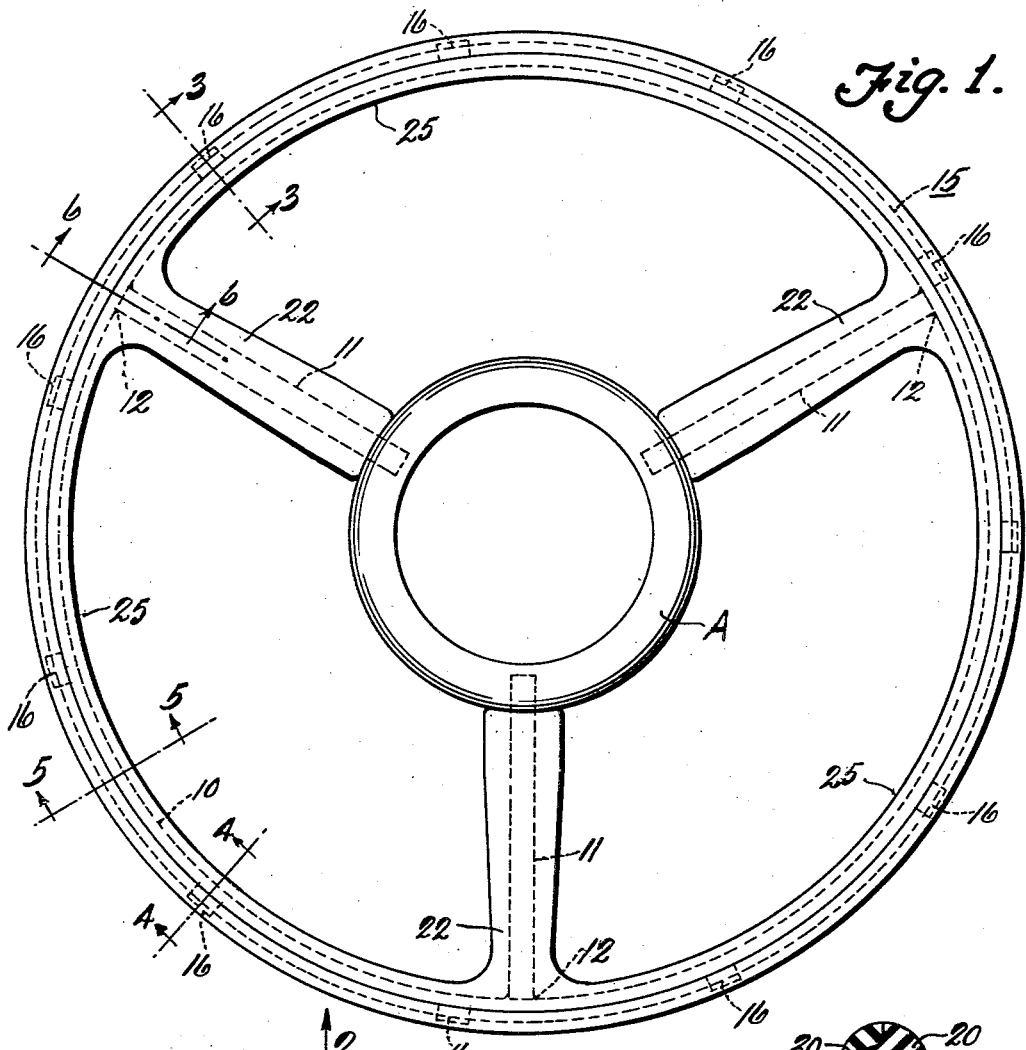
Fig. 1 shows a plan view of a steering wheel rim, having three integrally molded spokes, made according to this invention.
Figure 2:
Fig. 2 is a partial view taken in the direction of arrow 2 on Fig. 1.
Figure 5:
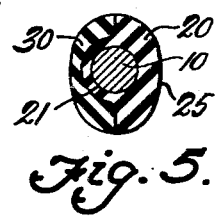
Figures 3, 4:
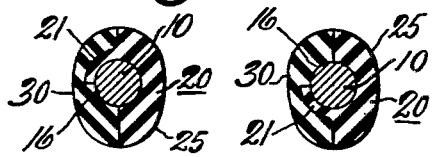

Fig. 3 is a sectional view on line 3—3 of Fig. 1.
Fig. 4 is a sectional view on line 4—4 of Fig. 1.
Fig. 5 is a sectional view on line 5—5 of Fig. 1.
Fig. 6 is a sectional view on line 6—6 of Fig. 1.

Figs. 7, 8 and 9 show a modified form of steering wheel rim made according to this invention.

Fig. 7 is a plan view of the double molded rim, showing part of the second-molded outer portion broken away from the first-molded portion thereof.

Fig. 8 is a view taken in the direction of arrow 8 of Fig. 7.

Fig. 9 is a section on line 9—9 of Fig. 7.

Figs. 10 through 14 show a mold in the various steps used in the method of manufacturing one type of wheel.

Similar reference characters refer to similar parts throughout the several views.

Referring to the form shown in Figs. 1 to 6 inclusive, 10 designates the metal annular ring reinforcement for the molded rim and 11 designates the metal spoke reinforcements whose outer ends are rigidly welded to the rim ring 10 at points 12 to form what is commonly termed the reinforcement spider 15.

In carrying out the method of this invention, the metal rim ring 10 is located as an insert in proper position in the first mold cavity by a series of inwardly projecting mold portions (suitably spaced around the outer periphery of the rim cavity) which directly contact the outer periphery of rim ring 10 at small areas 16 thereon (see Figs. 1, 3 and 4).

It will be noted from Figs. 3 and 4 that said small areas 16 are all located on the outer half of the periphery of rim ring 10, and that some of said areas 16 are on the upper half of the ring 10 while other (preferably alternate) areas 16 are on the lower half of ring 10. Thus the projecting mold portions which contact ring 10 at areas 16 thereof will acting together positively locate ring 10 against displacement in any direction during the molding operation.

The first mold cavity is shaped to form the inner portion 20 (approximately half) of the rim section, and also form the portions 21 extending around ring 10 (see Figs. 5 and 6) except for the small areas 16 covered by the insert locating means at that time, as described above. Since the ring-embedding portions 21 extend around ring 10 over most of its entire length said portions 21 will serve to prevent the inner molded rim portion 20 from contracting inwardly away from ring 10 due to shrinkage. Also the first mold cavity is shaped to form the molded spoke portions 22 integral with the inner rim portion 20. Thus when such a cavity is filled with the first molding material and the first molding operation completed there will be formed the incomplete rim section 20 illustrated on the right sides of Figs. 3, 4, 5, together with the molded spoke portions 22 integral therewith as illustrated on the right side of Fig. 6.

This first-molded unit is removed from the first mold and later set within the mold cavity of the second mold. The second mold cavity is made to accurately conform to the final molded surface walls 25 of the previously molded inner portion 20 of the rim section. Thus no further locating means will be required since said first-molded unit will accurately fit snugly upon the cavity walls of the second mold over the areas 25 extending around the inner periphery of the rim. Then the unfilled portion of the second mold cavity is completely filled with the second molding material to form the outer portion 30 of the rim section (see Figs. 3 to 6) and so complete the full rim section. It will be noted that the second-molded outer portion 30 will directly contact all the areas 16 spaced around the rim ring 10, and thus rim ring 10 will resist the tendency of the second-molded portion 30 to contract inwardly due to shrinkage. Thus ring 10 serves to resist shrinkage of both molded sections 20 and 30 and at the same time provide a strengthening reinforcement to the rim as a whole during its life.

The two different molding materials used to form the two separately molded sections 20 and 30 may be chosen from any well-known thermosetting resins, plastics, or other suitable molding compounds. Preferably two materials of contrasting color or outside appearance are chosen to provide a more pleasing or decorative appearance. If so desired, the inner section 20 may be molded from a suitable material especially selected for its strength in order to provide all the necessary strength required in the wheel rim, in which case the outer rim section 30 may be molded from a material especially selected for its decorative appearance, or economy in cost of material or molding. The mold cavities of course may be filled by the well-known injection method or any other known method suitable for use with the particular molding material chosen in any case. The method of this invention of course is not limited to any particular molding materials nor means used therewith for filling the mold cavities, since many such may be used according to the teachings of this invention.

In the modified construction shown in Figs. 7, 8 and 9, the rim ring 10' and spoke reinforcements 11' are first fully embedded within the first-molded material to form the rim portion 20' and spoke portions 22' at one molding operation. Thereafter this first-molded unit is set snugly within a second mold cavity conforming in shape thereto except that said second cavity provides for molding a decorative band 30' of different material around the outer periphery of the first-molded rim 20'. This decorative band 30' is then molded in a second molding operation onto the outer peripheral surface of rim portion 20' and is very tightly held in place thereupon by its tendency to shrink to a smaller diameter upon being cured under heat. In this form of rim no part of the decorative band 30' need contact the metal ring 10' since the rim portion 20' will be made sufficiently strong to take care of the pressure exerted thereupon by the relatively light band 30' contracting inwardly thereupon by shrinkage. This decorative band 30' may have any desired exterior shape and be of any suitable material contrasting in color or surface appearance with the rim portion 20'. The steering wheel hub portions A and A' are shown in the drawings merely to illustrate the final structure of complete steering wheels wherein the inner projecting ends of spoke reinforcements 11 and 11' are suitably fixed to said hubs by welding or other suitable means.

Figure 10:
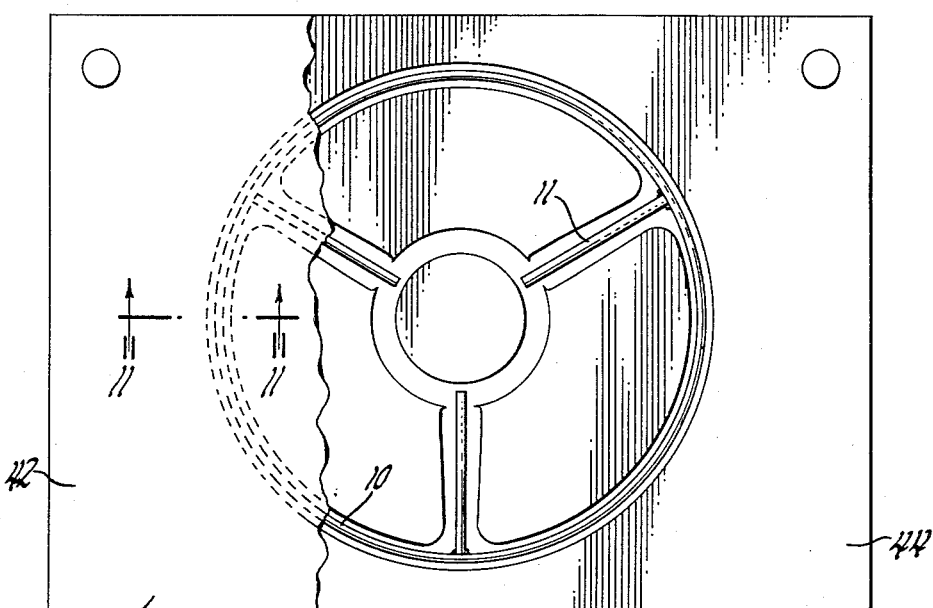
Figure 11:
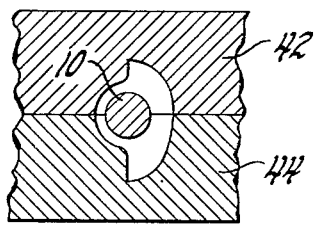
Figure 12:
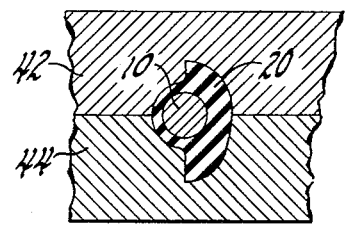
Figure 13:
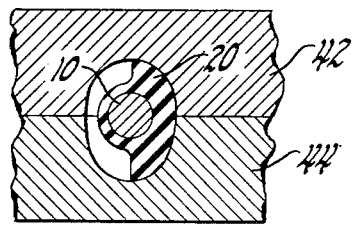
Figure 14:
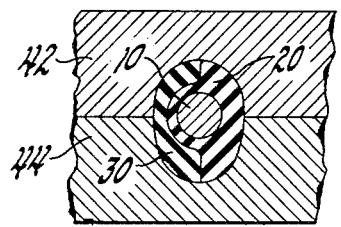

For the sake of clarity, Figs. 10 through 14 are included to show the steps in the method of producing one type of steering wheel wherein a mold 40 having upper and lower sections 42 and 44, respectively, is used to hold the rim ring insert 10. The first mold is shown in Figs. 10 through 12 and is used to mold the portion 20 around the ring 10. Thereafter, the partially completed wheel, including the partial rim portion 20, is positioned in a second mold similar in all respects to the mold shown in Fig. 10, but with a cavity therein having a cross section similar to that noted in Figs. 13 and 14. A second molding operation is then carried out to provide the portion 30 of the wheel rim whereupon the complete molding is accomplished and a rim on the wheel having two different colors is provided.

While the embodiment of the present invention as herein disclosed, constitutes a preferred form, it is to be understood that other forms might be adopted.

What is claimed is as follows:

1. The method of making a steering wheel rim having a reinforcing ring covered by two different molded materials each constituting a discrete portion of the periphery thereof, which comprises, positively locating a reinforcing ring in a first mold cavity and forming a first molded rim portion including a first discrete part of the rim periphery in interlocking relation with said ring by a first molding operation, then locating said discrete part of the rim periphery in contiguous relation with a correspondingly shaped cavity wall of a second and larger mold cavity, and thereafter forming a second molded rim portion including a second discrete part of the rim periphery upon the exposed portion only of said first molded rim portion by a second molding operation to complete the rim periphery.

2. The steps in the method of making a steering wheel rim having a metal reinforcing ring within two different molded materials each constituting a discrete portion of the periphery thereof, comprising: positively locating a metal reinforcing ring in a first mold cavity, molding one molding material thereupon to at least partially embed said ring and form an inner rim portion on the radially inner side of said ring and including a predetermined part of the final rim periphery, then placing the first-molded rim portion and metal ring in a second and larger mold cavity and locating same therein by fitting the part of the final rim periphery molded thereon in contiguous relation with correspondingly shaped cavity walls in said larger mold cavity, then filling the outer unfilled portion of said larger cavity with a second molding material and molding the remaining outer portion only of the rim periphery directly upon the first-molded rim portion, whereby said outer rim portion shrinks tightly upon the previously molded inner rim portion.

3. The steps in the method of making a steering wheel rim having a metal reinforcing ring embedded within two different molded materials each constituting a discrete portion of the periphery thereof, comprising: molding one molding material in a first molding operation to embed the metal reinforcing ring and form an incomplete rim section but including a predetermined part of the final rim periphery, then locating said incomplete first-molded rim section in a second and larger mold cavity and locating same therein by fitting the part of the final rim periphery thereon in contiguous relation with correspondingly shaped cavity walls in said larger cavity, then molding a second molding material in said larger cavity to form another discrete part of the final rim periphery on said first molded rim section to complete the final rim section.

References Cited in the file of this patent

UNITED STATES PATENTS

| | | |
|---|---|---|
| 1,625,449 | Bohn | Apr. 19, 1927 |
| 1,901,599 | Husted | Mar. 14, 1933 |
| 1,978,985 | Cobb | Oct. 30, 1934 |
| 2,081,592 | Lyon | May 25, 1937 |
| 2,086,493 | Ellingwood | July 6, 1937 |
| 2,185,568 | Ratner | Jan. 2, 1940 |
| 2,266,432 | Morin | Dec. 16, 1941 |
| 2,285,963 | Gits | June 6, 1942 |
| 2,358,259 | Siedschlag | Sept. 12, 1944 |
| 2,623,405 | Sampson | Dec. 30, 1952 |